Figure 1:
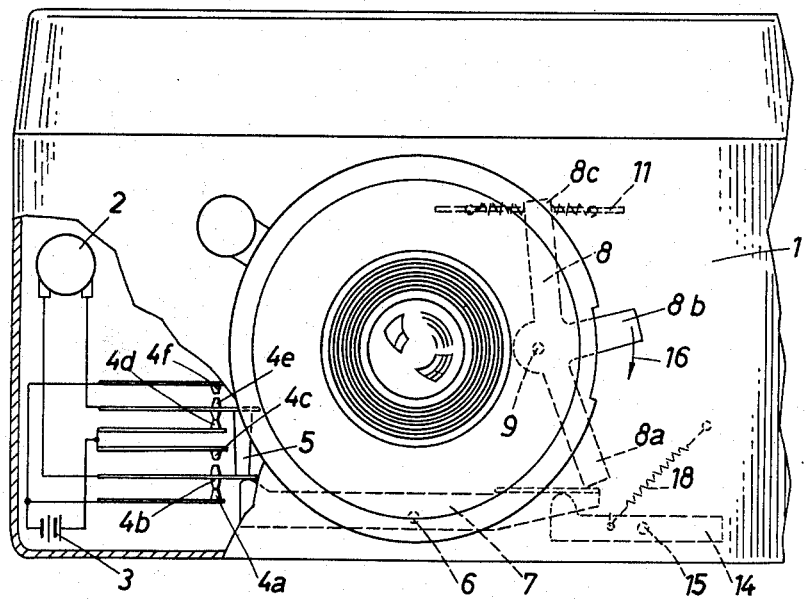

March 31, 1964  R. SCHRÖDER ETAL  3,126,805
CONTROLS FOR A REVERSIBLE ELECTRIC MOTOR OF A CAMERA
Filed March 4, 1963

INVENTOR.
ROLF SCHRÖDER
ALFRED WINKLER
BY
Michael S. Striker
ATTORNEY

United States Patent Office 3,126,805
Patented Mar. 31, 1964

3,126,805
CONTROLS FOR A REVERSIBLE ELECTRIC MOTOR OF A CAMERA
Rolf Schröder and Alfred Winkler, Munich, Germany, assignors to Agfa Aktiengesellschaft, Leverkusen, Germany
Filed Mar. 4, 1963, Ser. No. 262,659
Claims priority, application Germany Mar. 2, 1962
10 Claims. (Cl. 95—31)

The present invention relates to cameras.

In particular, the present invention relates to still cameras in which the film is moved by a reversible electric motor. Such reversible electric motors run in a forward direction for actuating a suitable drive to advance the film frame by frame during exposure of the film, and then a suitable switch is manually actuated for the purpose of running the electric motor in a reverse direction so that the exposed film can be rewound in the camera.

The reversing of the direction of rotation of the electric motor for rewinding the film in the camera is usually brought about by manual movement of a suitable control such as a lever, for example, from a forward position to a reverse position where the electric motor will run in the reverse direction for the purpose of rewinding the film. It sometimes happens, however, that the operator forgets to turn such a control lever to its forward position when unexposed film is in the camera and it is desired to expose the film therein. The result is that through carelessness the motor will be run in its reverse direction when it should instead be run in its forward direction, with the result that the unexposed film is rewound unintentionally and of course the leading end of the film strip which has already been attached to the take-up spool is pulled away from the spool and even rewound completely into the interior of the film cassette, so that there is not even a portion of the leading end of the film strip extending from the cassette to enable the operator to again attach the film to the take-up spool if the motor has not been set so as to run in the forward direction.

It is a primary object of the present invention to provide a camera of the above type with a structure which will guarantee that when new film is placed in the camera the motor will necessarily run in its forward direction so that the above drawbacks will be avoided Another object of the present invention is to provide a structure which enables the operator to control in a manual manner the forward and reverse running of the electric motor of the camera while at the same time automatically setting the camera for running in its forward direction whenever exposed film is removed from the camera and unexposed film introduced into the camera.

A further object of the present invention is to provide a structure of the above type which will not only automatically control the running of an electric motor of the camera but which will in addition be capable of automatically controlling part of the structure driven by the electric motor such as the double-exposure preventing structure.

A still further object of the present invention is to provide a structure of the above type which will respond automatically to opening of the camera for setting the motor for operation in a forward, film-advancing direction.

Also, the objects of the present invention include the provision of structure capable of accomplishing all of the above objects and at the same time composed of simple rugged elements which are very reliable in operation and which will occupy only a small amount of space.

With the above objects in view, the invention includes, in a camera, a camera housing which has a wall portion which is movable, with respect to the remainder of the camera housing, away from a closed position, closing the camera housing, for the purpose of removing exposed film from the interior of the camera housing and introducing unexposed film into the interior of the camera housing, the movable wall portion of the camera housing being movable back to the closed position for closing the camera housing. A reversible electric motor means is carried by the camera housing for advancing film therein when the motor means runs in a forward direction and for rewinding film therein when the motor means runs in a reverse direction. A switch means is electrically connected to the motor means and has a forward position for running the motor means in its forward direction and a reverse position for running the motor means in its reverse direction. An automatic means operatively engages the switch means and the movable wall portion of the camera housing for automatically moving the switch means from its reverse position to its forward position when the movable wall portion of the camera housing moves away from its closed position, so that in this way the switch means is automatically placed in its forward position when unexposed film is introduced into the camera housing.

Figure 2:
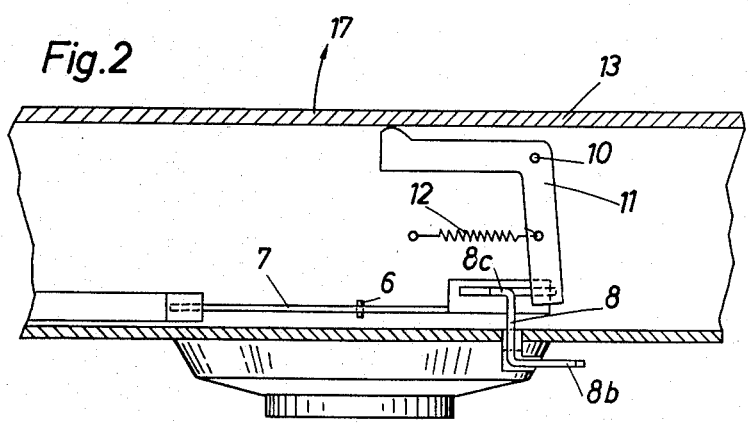

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a diagrammatic front elevation of a camera provided with the structure of the invention; and FIG. 2 is a diagrammatic sectional top plan view further illustrating the structure of the invention.

Referring now to the drawing, there is shown therein a camera housing 1 which carries, in a manner well-known in the art, a reversible electric motor means 2 which is diagramamtically illustrated in FIG. 1. The motor means 2 derives its energy from the battery 3, as diagrammatically shown in FIG. 1, and when the motor means 2 runs in a forward direction it actuates a drive well-known in the art for advancing the film in the camera while when the motor means 2 runs in a reverse direction it acts through the drive to rewind the exposed film. The drive means operated from the motor is not illustrated for the sake of simplicity, and such drives are well-known in the art for advancing the film by a distance equal to a single film frame after each exposure.

The camera housing also is provided with a switch means which is connected electrically to the motor means 2 in the manner shown in FIG. 1, this switch means having a forward position for running the motor 2 in its forward direction and a reverse position for running the motor 2 in the reverse direction. As is shown in FIG. 1, the switch means includes the series of contacts 4a–4f. The contacts 4a, 4c, 4d, and 4f are stationary while the contacts 4b and 4e are movable. When the contacts 4b and 4e respectively engage the contacts 4a and 4d, as shown in FIG. 1, the switch means is in its forward position for running the motor means 2 in its forward direction, while when the switch member 4b and the switch member 4e respectively engage the switch members 4c and 4f, the switch means is in its reverse position for running the motor 2 in its reverse direction. An elongated member 5 of electrically non-conductive material extends between and is fixed to the switch members 4b and 4e, so that these switch members necessarily move together in order to place the switch means in its forward and reverse positions.

An elongated lever 7 is supported by a stationary pin 6 within the camera housing 1 for turning movement, and one end of the lever 7 engages the switch member 4b just beneath the connecting member 5, as indicated in FIG. 1. The other end of the lever 7 is engaged by an arm 8a of a three-armed lever 8 which is supported for turning movement by a stationary pin 9 located in the camera, and this lever 8 forms a manually operable lever means which has an arm 8b which extends to the exterior of the camera so as to be accessible to the operator, and thus the operator can turn the manually operable means 8. This lever means 8 includes a third arm 8c for a purpose described below.

An automatic lever means 11 is also located in the camera housing 1 and is supported for turning movement by a stationary pin 10, and a spring means 12 acts on the lever 11 so as to urge the latter to turn in a clockwise direction, as viewed in FIG. 2. The left free end of the lever 11, as viewed in FIG. 2, is urged by the spring 12 against the inner surface of a movable wall portion 13 of the camera housing 1. This movable wall portion 13 is capable of moving from the illustrated closed position, where it closes the camera housing, away from this position for the purpose of giving access to the interior of the camera housing, and the wall portion 13 moves in the direction of the arrow 17 away from the remainder of the camera housing when it is desired to remove exposed film from the interior of the camera housing and to introduce unexposed film into the interior of the camera housing, the wall 13 then being movable back to its closed position for closing the camera housing. This wall portion 13 may take the form of a removable back wall of the camera housing or the form of a wall which is hingedly connected to the remainder of the camera housing, although the invention is of course equally applicable to a structure where the movable wall portion 13 is in the form of a removable bottom wall of the camera housing.

In the drawings the structure of the invention is illustrated in the position which it takes when the switch means is in its forward position and the film in the camera will be advanced frame-by-frame so as to be exposed therein. An additional lever 14 is supported for turning movement by a stationary pin 15 and is urged by a spring 18 in a clockwise direction so that the left end of the lever 14 engages the lever 7 to be controlled by the latter. This lever 14 is adapted to cooperate with the drive which is driven by the motor 2, and in particular the lever 14 is capable of coupling and uncoupling the double-exposure prevention structure of the camera, the double-exposure preventing structure being in its coupled position where it will prevent a double exposure when the parts are in the position shown in FIG. 1.

Assuming that the film in the camera has been fully exposed, which is to say the desired number of film frames have been exposed, then, in order to rewind the film, the operator will engage the arm 8b of the manually operable means 8 and turn the lever 8 in the direction of the arrow 16. This will cause the arm 8a of the lever 8 to turn the lever 7 in a clockwise direction so as to raise the switch members 4b and 4e from their positions respectively contacting the contacts 4a and 4d into the reverse position respectively contacting the contacts 4c and 4f, and in addition the clockwise turning of the lever 7 will result in counterclockwise turning of the lever 14 for rendering the double-exposure preventing structure inoperative and also for putting out of operation any other part of the drive which might interfere with the rewinding of the film. Thus, the simple turning of the lever 8 by the operator in the direction of the arrow 16 will serve to place the switch means in its reverse position and thus the motor 2 will be run in the reverse direction and the film will be rewound. After the film has been rewound the operator will move the movable wall portion 13 of the camera away from the closed position thereof shown in FIG. 2, and now it will be possible for the operator to remove the exposed film and to introduce unexposed film into the camera. The movement of the movable wall portion 13 of the camera housing in the direction of the arrow 17 releases the automatic means 11 to the force of the spring means 12 so that the lever 11 is now turned in a clockwise direction by the spring 12, and thus the forward free end portion of the lever 11 will engage the arm 8c and automatically turn the lever 8 in a counterclockwise direction, as viewed in FIG. 1, which is to say in a direction opposite to that indicated by the arrow 16 in FIG. 1. The arm 8a of the lever 8 will therefore move upwardly and the lever 7 will follow this movement of the arm 8a either as a result of the inherent resiliency of the springy switch members 4e and 4b which by their own resiliency tend to assume the position shown in FIG. 1 or as a result of the action of a suitable spring which is connected to the lever 7 for urging the latter to turn in a counterclockwise direction, as viewed in FIG. 1. Thus, the automatic means 11 responds automatically to the movement of the wall portion 13 from its closed position for acting through the lever means 8 and the lever 7 on the switch means to place the latter in its forward position when the camera is opened, and thus it is not possible for the operator to forget to return the switch means to this forward positions when a new film strip is to be exposed. Of course, the return of the lever 8 to the position shown in FIG. 1 also results in return of the lever 14 to the position shown in FIG. 1 so that the double exposure preventing structure is also set into operation automatically. It will be noted that the spring 18 acts at this time to cause the left free end of the lever 14 to follow the movement of the lever 7. When the movable wall portion 13 of the camera housing is returned to its closed position closing the camera housing the lever 11 is automatically moved in opposition to the spring 12 to the position illustrated in FIG. 2, so that the operator is free at any time to turn the lever 8 again in the direction of the arrow 16 for initiating the rewinding of the film. The forward free end portion of the lever 11 simply moves away from the arm 8c out of engagement therewith so that the manually operable means 8 remains in its forward position locating the switching means in its forward position after the movable wall portion 13 is returned to its closed position, and at the same time the operator can at any time turn the lever 8 in the direction of the arrow 16 to its reverse position placing the switch means in its reverse position as described above. The lever 8 may be releasably maintained in both of its positions, which is to say its forward and reverse positions, by a light detent mechanism such as a spring pressed ball carried by the lever 8 and cooperating with a pair of recesses formed in a stationary wall portion of the camera, so that this detent structure can easily be overcome for moving the lever 8 while at the same time retaining the latter either in its forward position or in its reverse position. The force of the detent structure required for holding the lever 8 in its reverse position need only be strong enough to be incapable of being overcome by the force of the springy contacts 4e and 4b or need only be stronger than any spring which acts on the lever 7 to urge it to the position illustrated in FIG. 1. However, the force of the detent structure must be less than that of the spring 12 so that when the spring 12 turns the lever 11 in a clockwise direction, as viewed in FIG. 2, the lever 11 will be capable of displacing the lever 8 from its reverse position back to its forward position. Of course, instead of providing structures where the arm 8a and the lever 7 simply engage each other and where the lever 14 and the lever 7 simply engage each other, it is possible to interconnect these elements for movement together, by suitable pin-and-slot connections, for example, so that in this way it is possible to avoid the use of energy-consuming return springs.

It is believed to be apparent that with the above-described structure of the invention whenever the camera is opened by moving the wall portion 13 away from its closed position the lever 8 will be automatically moved to its forward position resulting in movement of the switch means to its forward position so that it is impossible with the structure of the invention for the operator to make an exposure of new film with the motor means 2 operated in its reverse direction as a result of forgetfulness on the part of the operator.

It will be understood that each of the elements described above, or two or more together, may also find a useful application in other types of cameras differing from the types described above.

While the invention has been illustrated and described as embodied in cameras with reversible motors, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, a camera housing having a movable wall portion movable with respect to the remainder of the camera housing away from a closed position closing the camera housing for the purpose of removing exposed film from the interior of said housing and introducing unexposed film into said housing and then movable back to said closed position for closing said housing; reversible electric motor means carried by said housing for advancing film therein when said motor means runs in a forward direction and for rewinding exposed film when said motor means runs in a reverse direction; switch means connected electrically with said motor means and having a forward position for running said motor in said forward direction and a reverse position for running said motor in said reverse direction; and automatic means operatively engaging said switch means and said wall portion of said housing for automatically moving said switch means from said reverse to said forward position thereof when said wall portion is moved away from and back to said closed position thereof.

2. In a camera, in combination, a camera housing having a movable wall portion movable with respect to the remainder of said housing away from a closed position closing said housing for the purpose of removing exposed film from the interior of said housing and introducing unexposed film into said housing and then movable back to said closed position for closing said housing; reversible electric motor means carried by said housing for advancing film therein when said motor means runs in a forward direction and for rewinding film in said housing when said motor means runs in a reverse direction; switch means connected electrically to said motor means and having a forward position for running said motor in said forward direction and a reverse position for running said motor in said reverse direction; manually operable means operatively connected to said switch means and carried by said housing for movement between a forward position placing said switch means in said forward position thereof and a reverse position for placing said switch means in said reverse position thereof, said manually operable means being moved by the operator from said forward to said reverse position thereof for placing said switch means in said reverse position thereof when it is desired to rewind film in the camera; and automatic means carried by said camera housing and operatively engaging said manually operable means and said wall portion of said camera for automatically moving said manually operable means from said reverse to said forward position thereof when said wall portion of said camera housing is moved away from and back to said closed position thereof.

3. In a camera, in combination, a camera having a movable wall portion movable away from a closed position closing said camera housing for the purpose of removing exposed film from the interior of said camera housing and introducing unexposed film into the interior of said camera housing, said movable wall portion then being movable back to said closed posititon thereof for closing the camera housing with the unexposed film therein; reversible electrirc motor means carried by said camera housing for advancing film therein when said motor means runs in a forward direction and for rewinding film therein when said motor means runs in a reverse direction; switch means electrically connected to said motor means and having a forward position for running said motor in said forward direction and a reverse position for running said motor in said reverse direction; manually operable means movably carried by said camera housing for movement between forward and reverse positions and operatively connected to said switch means for placing the latter in said forward position thereof when said manually operable means is in its forward position, said manually operable means being moved by the operator from said forward to said reverse position thereof for placing said switch means in said reverse position thereof when it is desired to rewind film in the camera; and automatic means operatively engaging said manually operable means and said wall portion of said camera for automatically moving said manually operable means from said reverse to said forward position thereof when said wall portion of said camera is moved away from said closed position thereof.

4. In a camera, in combination, a camera having a movable wall portion movable away from a closed position closing said camera housing for the purpose of removing exposed film from the interior of said camera housing and introducing unexposed film into the interior of said camera housing, said movable wall portion then being movable back to said closed position thereof for closing the camera housing with the unexposed film therein; reversible electric motor means carried by said camera housing for advancing film therein when said motor means runs in a forward direction and for rewinding film therein when said motor means runs in a reverse direction; switch means electrically connected to said motor means and having a forward position for running said motor in said forward direction and a reverse position for running said motor in said reverse direction; manually operable means movably carried by said camera housing for movement between forward and reverse positions and operatively connected to said switch means for placing the latter in said forward position thereof when said manually operable means is in its forward position, said manually operable means being moved by the operator from said forward to said reverse position thereof for placing said switch means in said reverse position thereof when it is desired to rewind film in the camera; and automatic means operatively engaging said manually operable means and said wall portion of said camera for automatically moving said manually operable means from said reverse to said forward position thereof when said wall portion of said camera is moved away from said closed position thereof, said manually operable means remaining in said forward position thereof and being uninfluenced by said automatic means when said wall portion of said camera housing is moved back to said closed position thereof.

5. In a camera, in combination, a camera housing having a movable wall portion movable with respect to the remainder of said camera housing away from a closed position closing said camera housing for the purpose of removing exposed film from the interior of said camera housing and introducing unexposed film into the interior of said camera housing, said movable wall portion then being movable back to said closed position thereof for closing the camera housing with the unexposed film therein; reversible electric motor means carried by said camera housing for advancing film therein when said motor means runs in a forward direction and for rewinding film therein when said motor means runs in a reverse direction; electrical switch means connected electrically to said motor means and having a forward position for running said motor means in said forward direction and a reverse position for running said motor means in said reverse direction; a manually turnable lever turnably carried by said camera housing and having three arms one of which is accessible at the exterior of the camera housing so that the operator may engage said one arm for turning said lever, said lever having a second arm operatively connected to said switch means for placing said switch means in said forward position thereof when said lever is turned to a forward position and for placing said switch means in said reverse position thereof when said lever is turned to a reverse position, said one arm being accessible to the operator for manually turning of said lever from said forward to said reverse position thereof when it is desired to rewind film in the camera; and automatic means carried by said camera housing and operatively engaging the third arm of said lever and said movable wall portion of said camera housing for automatically turning said lever to said forward position thereof when said movable wall portion is moved away from said closed position thereof.

6. In a camera, in combination, a camera housing having a movable wall portion movable with respect to the remainder of said camera housing away from a closed position closing said camera housing for the purpose of removing exposed film from the interior of said camera housing and introducing unexposed film into the interior of said camera housing, said movable wall portion then being movable back to said closed position thereof for closing the camera housing with the unexposed film therein; reversible electric motor means carried by said camera housing for advancing film therein when said motor means runs in a forward direction and for rewinding film therein when said motor means runs in a reverse direction; electrical switch means connected electrically to said motor means and having a forward position for running said motor means in said forward direction and a reverse position for running said motor means in said reverse direction; a manually turnable lever turnably carried by said camera housing and having three arms one of which is accessible at the exterior of the camera housing so that the operator may engage said one arm for turning said lever, said lever having a second arm operatively connected to said switch means for placing said switch means in said forward position thereof when said lever is turned to a forward position and for placing said switch means in said reverse position thereof when said lever is turned to a reverse position, said one arm being accessible to the operator for manually turning of said lever from said forward to said reverse position thereof when it is desired to rewind film in the camera; and automatic lever means turnably carried by said camera housing and operatively engaging the third arm of said manually turnable lever and said movable wall portion of said camera housing for automatically turning said manually turnable lever from said reverse to said forward position thereof when said wall portion of said housing is moved away from said closed position thereof.

7. In a camera, in combination, a camera housing having a movable wall portion movable away from a closed position closing said camera housing for removing exposed film from the interior of the camera housing and for introducing unexposed film into the interior of said camera housing, said movable wall portion then being movable back to said closed position thereof for closing the camera housing with the unexposed film therein; reversible electric motor means carried by said camera housing for advancing film therein when said motor means runs in a forward direction and for rewinding film therein when said motor means runs in a reverse direction; switch means connected electrically to said motor means and having a forward position for running said motor means in said forward direction and a reverse position for running said motor means in said reverse direction; a manually operable lever turnably carried by said camera housing and having three arms one of which is accessible to the operator for turning said lever between forward and reverse positions; a second lever turnably carried by said camera housing and engaging said switch means for moving the latter between said positions thereof, said second lever being engaged by a second arm of said manually operable lever for moving said switch means from said forward to said reverse position thereof when said manually operable lever is turned from said forward to said reverse position thereof and for returning said switch means from said reverse to said forward position thereof when said manually operable lever is moved from said reverse to said forward position thereof, said manually operable lever being turnable by the operator from said forward to said reverse position thereof and then acting on said second lever for moving said switch means from said forward to said reverse position thereof when it is desired to rewind film in the camera; and automatic lever means turnably carried by said camera housing and operatively engaging the third arm of said manually operable lever and said movable wall portion of said camera housing for automatically turning said manually operable lever from said reverse to said forward position thereof when said movable wall portion of said camera housing is moved away from said closed position thereof.

8. In a camera, in combination, a camera housing having a movable wall portion movable away from a closed position closing said housing for the purpose of removing exposed film from the interior of said housing and introducing unexposed film into the interior of said housing, said movable wall portion then being movable back to said closed position thereof for closing the camera housing with the unexposed film therein; reversible electric motor means carried by said camera housing for advancing film therein when said motor means runs in a forward direction and for rewinding film therein when said motor means runs in a reverse direction; switch means electrically connected to said motor means and having a forward position for running said motor means in said forward direction and a reverse position for running said motor means in said reverse direction; manually operable lever means carried by said housing for turning movement between forward and reverse positions, said manually operable lever means being operatively connected to said switch means for placing the latter in said forward position thereof when said manually operable lever means is in a forward position thereof and for placing said switch means in said reverse position thereof when said manually operable lever means is in a reverse position, said manually operable lever means having a portion accessible to the operator so that the operator can move said manually operable lever means from said forward to said reverse position thereof when it is desired to rewind film in the camera; automatic lever means turnably carried by said camera housing in the interior thereof; and spring means operatively connected to said automatic lever means for urging a portion thereof against said wall portion of said camera housing when said wall portion is in said closed position thereof, movement of said wall portion of said camera housing away from said closed position thereof releasing said automatic lever means to said spring means to be moved by the latter into engagement with a portion of said manually operable lever means for automatically moving the latter from said reverse to said forward position thereof.

9. In a camera, in combination, a camera housing having a movable wall portion movable away from a closed position closing said housing for the purpose of removing exposed film from the interior of said housing and introducing unexposed film into the interior of said housing, said movable wall portion then being movable back to said closed position thereof for closing the camera housing with the unexposed film therein; reversible electric motor means carried by said camera housing for advancing film therein when said motor means runs in a forward direction and for rewinding film therein when said motor means runs in a reverse direction; switch means electrically connected to said motor means and having a forward position for running said motor means in said forward direction and a reverse position for running said motor means in said reverse direction; manually operable lever means carried by said housing for turning movement between forward and reverse positions, said manually operable lever means being operatively connected to said switch means for placing the latter in said forward position thereof when said manually operable lever means is in a forward position thereof and for placing said switch means in said reverse position thereof when said manually operable lever means is in a reverse position, said manually operable lever means having a portion accessible to the operator so that the operator can move said manually operable lever means from said forward to said reverse position thereof when it is desired to rewind film in the camera; automatic lever means turnably carried by said camera housing in the interior thereof; and spring means operatively connected to said automatic lever means for urging a portion thereof against said wall portion of said camera housing when said wall portion is in said closed position thereof, movement of said wall portion of said camera housing away from said closed position thereof releasing said automatic lever means to said spring means to be moved by the latter into engagement with a portion of said manually operable lever means for automatically moving the latter from said reverse to said forward position thereof, said automatic lever means being moved in opposition to said spring means upon return of said wall portion of said camera housing to said closed position thereof to a position out of engagement with said manually operable lever means leaving the latter in said forward position thereof.

10. In a camera, in combination, a camera housing having a movable wall portion movable away from a closed position closing said camera housing for removing exposed film from the interior of the camera housing and for introducing unexposed film into the interior of the camera housing, said movable wall portion being movable back to said closed position thereof for closing the camera housing with the unexposed film therein; reversible electric motor means carried by the camera housing for advancing film therein when said motor means runs in a forward direction and for rewinding film in said camera housing when said motor means runs in a reverse direction; switch means electrically connected to said motor means and having a forward position for running said motor means in said forward direction and a reverse position for running said motor means in said reverse direction; a first lever turnably carried by said camera housing and operatively connected to said switch means for moving the same between said positions thereof; a second lever actuated by said first lever during movement of the latter to change the position of said switch means, said second lever being adapted to cooperate with a drive which is driven by said motor means; manually operable lever means turnably carried by the camera housing and cooperating with said first lever for turning the latter; and automatic means operatively engaging said manually operable lever means and said movable wall portion of said camera housing for automatically placing said manually operable lever means in a position where said first lever will return said switch means from said reverse to said forward position thereof when said movable wall portion of said camera housing is moved away from said closed position thereof.

No references cited.